United States Patent [19]

MacDonald

[11] 4,109,562
[45] Aug. 29, 1978

[54] DEFOGGING DEVICE

[76] Inventor: Carl D. MacDonald, 17 Ottaway, Barrie, Ontario, Canada, M4L 2W6

[21] Appl. No.: 738,263

[22] Filed: Nov. 2, 1976

[51] Int. Cl.² .............................................. B60H 1/24
[52] U.S. Cl. ...................................... 98/2.19; 98/2.04; 98/92
[58] Field of Search ...................... 98/2.04, 2.09, 2.08, 98/18, 2.12, 2.19, 40 R, 40 C, 40 D, 92, 33 A

[56] References Cited

U.S. PATENT DOCUMENTS

| 1,806,059 | 5/1931 | Hoople | 98/1 |
|---|---|---|---|
| 2,036,230 | 4/1936 | Mulneaux | 98/2.04 |
| 2,045,826 | 6/1936 | Benolken | 98/2.04 |
| 2,079,203 | 5/1937 | Fagerburg | 98/92 |
| 2,102,418 | 12/1937 | Kirsch | 98/2.04 |
| 2,150,110 | 3/1939 | Strauss et al. | 98/2.04 |
| 2,225,070 | 12/1940 | Meyerhoefer | 98/33 A |
| 2,566,033 | 8/1951 | Reeves | 98/40 R |

Primary Examiner—William E. Wayner
Attorney, Agent, or Firm—Rogers, Bereskin & Parr

[57] ABSTRACT

A side window defogging device for a motor vehicle is described. The device is used in a motor vehicle having: a body structure which includes a windshield and at least one side window disposed rearwardly of the windshield; and a heater system for directing heated air over the inner surface of the windshield. The defogging device is disposed in the path of the heated air and defines an air deflecting surface which is spaced from an adjacent part of the vehicle body structure and which is arranged to deflect approaching heated air towards the inner surface of the side window.

7 Claims, 5 Drawing Figures

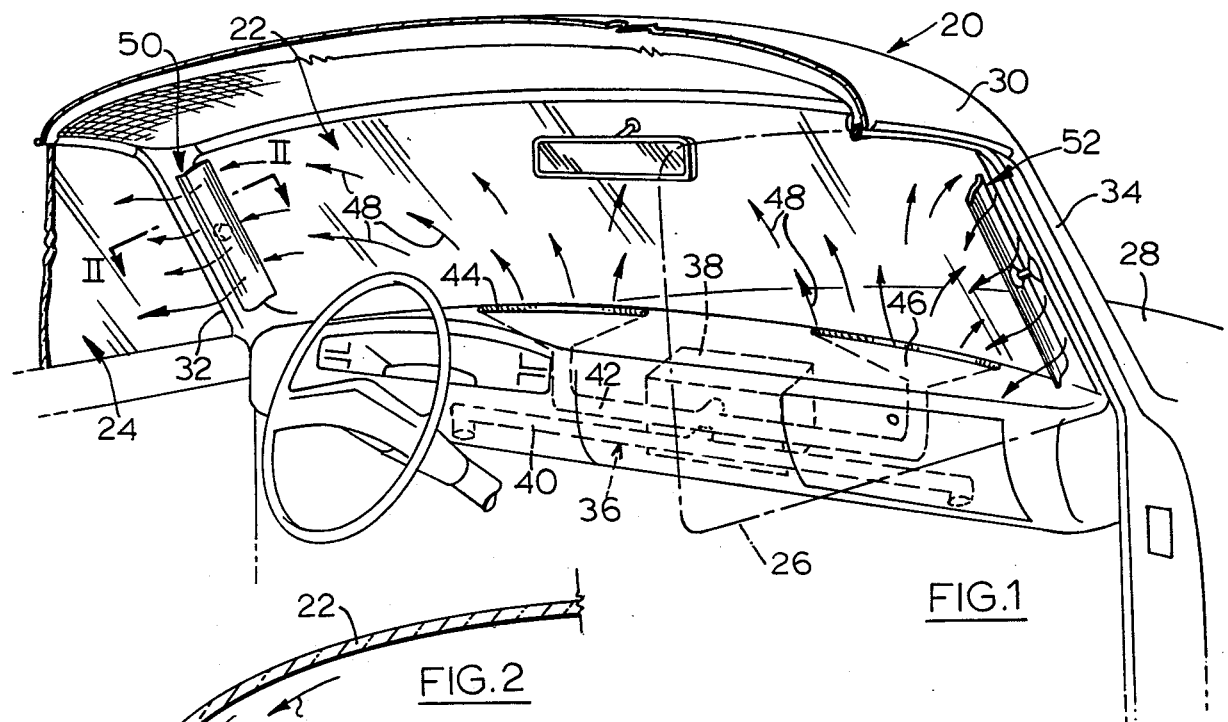
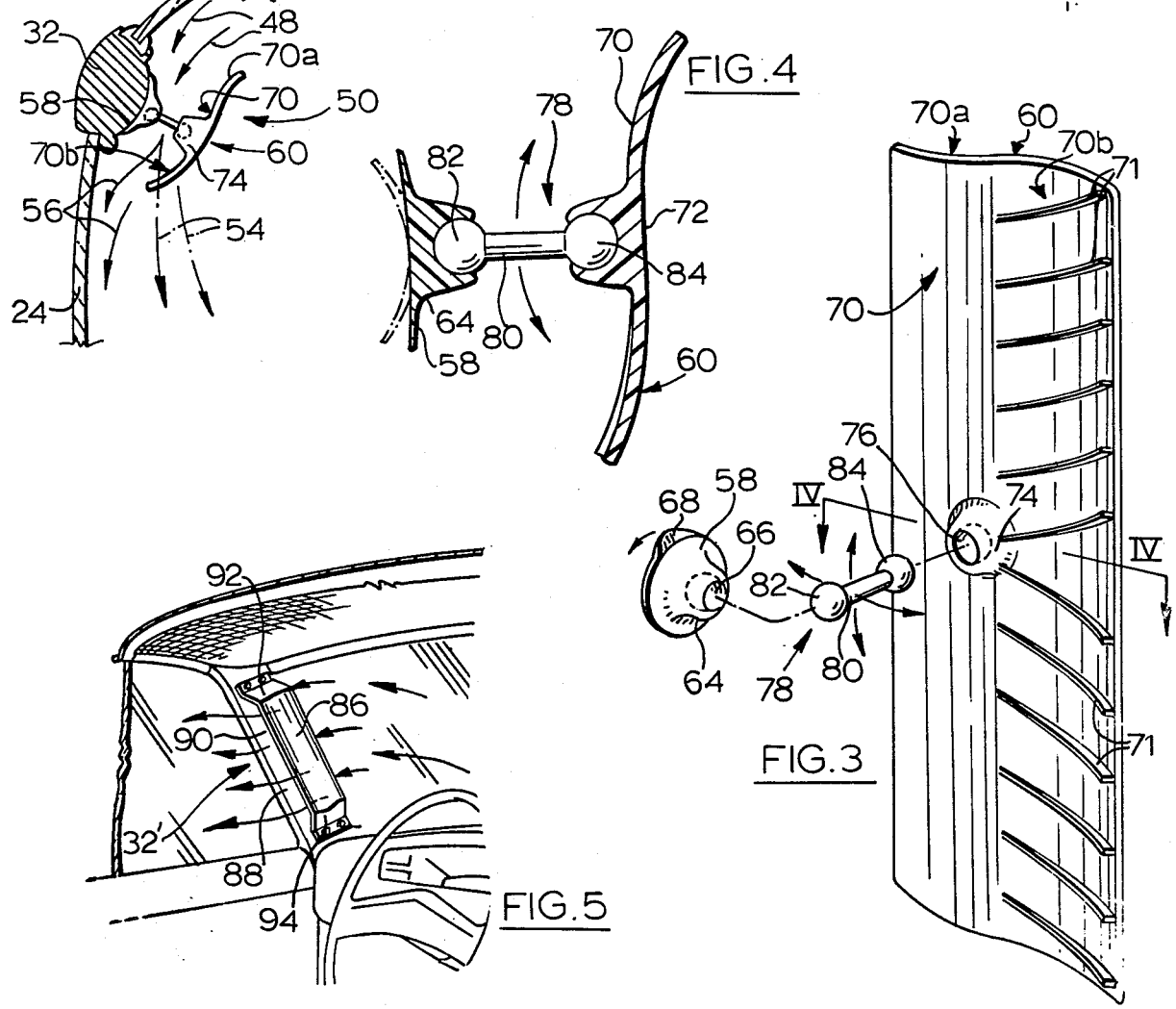

DEFOGGING DEVICE

This invention relates to a device for defogging side windows in motor vehicles.

Interior heater systems in, for example, passenger cars are generally designed for defogging of the vehicle windshield only. As is well known, these systems normally include outlets through which heated air is directed upwardly over the inner surface of the windshield. However, such systems often fail to effectively defog the side windows of the vehicle, particularly when the vehicle is being operated in conditions of low temperature or high humidity.

Prior attempts to provide effective side window defogging devices have generally proved not to be commercially acceptable. U.S. Pat. Nos. 2,036,230 and 2,045,826 disclose examples of two prior art side window defoggers. The inventions disclosed in both of these patents relate to automobile heater systems having ducting connected to specially-positioned heated air outlets adjacent side windows to be defogged. However, these systems have the disadvantages that they are relatively complex and would be expensive to manufacture. Also, they could probably only be used if the entire heater system of a vehicle were replaced by the system provided by the particular invention. In fact, these systems would probably have to be factory fitted in new vehicles; existing vehicles could probably not be economically converted.

An object of the present invention is to provide a side window defogging device of simple construction.

The device according to the invention is used in a motor vehicle having: a body structure which includes a windshield and at least one side window disposed rearwardly of the windshield; and a heater system for directing heated air over the inner surface of the windshield. The defogging device is disposed in the path of the heated air and defines an air deflecting surface which is spaced from an adjacent part of the vehicle body structure and which is arranged to deflect approaching heated air towards the inner surface of the side window.

The invention also provides an air deflector device per se for use in a motor vehicle.

In order that the invention may be more clearly understood, reference will now be made to the accompanying drawings which illustrate a number of embodiments of the invention by way of example, and in which:

FIG. 1 is a perspective view of part of the interior of a passenger car fitted with two side window defogging devices according to the invention;

FIG. 2 is a cross-sectional view on lin II—II of FIG. 1;

FIG. 3 is an exploded perspective view of one of the devices shown in FIG. 1;

FIG. 4 is a sectional view on line IV—IV of FIG. 3; and,

FIG. 5 is a view similar to part of FIG. 1, illustrating a different embodiment of the invention.

Referring first to FIG. 1, part of the body structure of a passenger car is indicated at 20 and includes a windshield 22 and front side windows 24 and 26; window 26 is shown in chain line only for clarity of illustration. The car also has the normal rear side and back windows (not shown). Part of the hood of the vehicle is visible at 28. Body structure 20 also includes a roof 30 supported by pillars, two of which are visible at 34 at respectively opposite sides of the windshield 22.

The car is provided with a conventional heater system shown diagrammatically at 36. The system includes a structure generally indicated at 38 which includes a heater core and a fan unit. The core is connected in the cooling system of the vehicle so that hot water is circulated through the core. The fan unit blows air from the interior of the vehicle over the core so that the air picks up heat. The heater system also includes ducting 40 and 42 for receiving the heated air. As is conventional, the ducting 40 is arranged to deliver air downwardly into the interior of the car, while the ducting 42 is coupled to outlets 44 and 46 at the base of the windshield 22.

In FIG. 1, the arrows denoted 48 indicate the heated air flowing over the inner surface of the windshield 22. It will be seen that the windshield is of compound curvature; that is, it curves both rearwardly and laterally. As a result, air leaving the heater system outlets 44 and 46 tends to flow upwardly and laterally as indicated by the arrows 48, towards the roof support pillars 32 and 34 of the body structure.

Side window defogging devices 50 and 52 according to the invention are mounted on the respective pillars in the paths of the air flows from the heater outlets 44 and 46. Device 50 is shown in section in FIG. 2. The air flow approaching the device is again indicated by arrows 48. The arrows shown in chain line and denoted 54 indicate how the air flow would be deflected by the pillar 32 in the absence of the device 50. It will be seen that the pillar deflects the air back towards the central region of the passenger carrying space of the car. The solid arrows denoted 56 show how the air is deflected by the device 50 along the inner surface of the side window 24, defogging the window.

Referring more particularly to FIGS. 2 to 4, the two defogging devices 50 and 52 are essentially identical and device 50 only will therefore be described as representative of both devices. Device 50 includes a mounting member 58 which is attached to the pillar 32 and a vane member 60 which is adjustably coupled to the mounting member as will be described. Mounting member 58 is an integral plastic molding and includes a circular base portion 62 having on one side a protuberant socket portion 64 formed with an opening 66. The opposite side of the base portion 62 is flat and is coated with a pressure-sensitive adhesive. A peel-off backing member 68 covers the adhesive and is shown partly removed in FIG. 3. Member 58 is molded in a soft plastic material and the base portion defines a relatively thin and flexible peripheral margin (see FIG. 4) so that the mounting member can conform with the shape of any appropriate surface to which it is fitted. By way of example, the base portion is shown in chain line at 62' in FIG. 4 in the position it adopts when fitted to the pillar 32 (indicated at 32').

The vane member is also molded in a plastic material and defines an inner air deflecting surface 70 which, as can be seen from FIG. 4, has the general shape of a flattened S when viewed in section. In front view, the vane 60 is of rectangular profile. Referring back to FIG. 2, it will be seen that this S-shaped configuration of the air deflecting surface 70 has the result of providing an outwardly curved leading portion 70a and an inwardly curved trailing portion 70b, considered in the direction of the approaching air flow 48. The outwardly curved portion 70a serves to entrain and deflect inwardly (i.e. towards pillar 32) the approaching heated air 48, while the inwardly curved trailing portion 70b serves to deflect that air towards the inner surface of the side window 24. A series of protuberant ribs or fins 71 are molded integrally into the inwardly curved portion 70b of surface 70 and serve to distribute the air over the window.

Vane member 60 has an outer surface indicated at 72 in FIGS. 2 and 4 which is of similar shape to the air deflecting surface 70 but without the ribs or fins 71. It is believed that the shaping of surface 72 does not significantly contribute to the operation of the device and that this surface could be differently shaped if required.

Referring again to FIGS. 3 and 4, the air deflecting surface 70 of vane 60 is provided generally at its centre with a socket portion 74 which has a central opening 76 and which is generally similar to the socket portion 64 of mounting member 58. A coupling element 78 extends between the mounting member 58 and the vane 60 and includes a central rod portion 80 having spherical portions 82 and 84 at its opposite ends which are received in the socket portions 64 and 74 of the mounting member 58 and vane 60 respectively.

It will be appreciated that the ball and socket coupling arrangement provided between the mounting member 58 and the vane 60 allows a substantial degree of adjustment of the position of the vane 60 with respect to the mounting member 58. Accordingly, with the device fitted in a vehicle, the vane 60 can be adjusted to a substantial extent to provide for maximum effectiveness of the device.

It will be evident from the foregoing that the effect of the two devices 50 and 52 will be to deflect the air flowing from the heater outlets 44 and 46 along the inner surfaces of the side windows 24 and 26 of the car. That air will tend to continue flowing rearwardly adjacent the outer sides of the body structure of the vehicle and accordingly along the inner surfaces of the rear side windows also. Accordingly, the air which has been used to deog the windshield 22 of the vehicle will also be used to defog the side windows.

Defogging devices according to the invention may be sold as vehicle accessories to be fitted to existing vehicles. Fitting will be accomplished simply by removing the backing 68 from the mounting member 58 of each device and pressing the device into position on the relevant roof support pillar of the vehicle body structure. The thin peripheral margin of the base portion may be trimmed off to fit neatly onto the pillar. Of course, the defogging devices may also be offered as factory fitted "options" on new vehicles. While factory fitted defogging devices may be manufactured as initially separate units as in the embodiment of FIGS. 1 to 4, the devices could also be built into the body structure of a vehicle. FIG. 5 shows an example of an in-built defogging device according to the invention. Primed reference numerals have been used in this view to denote parts which correspond with FIG. 1.

In the FIG. 5 embodiment, the roof support pillar 32' of the vehicle includes a built-in air deflecting vane 86 which defines with the main portion 88 of the pillar 32' an air passageway 90. Vane 86 has integral support portions 92 and 94 at opposite ends which are secured by screws to the main body 88 of the pillar 32'. Vane 86 defines an inner air deflecting surface 96 which is shaped to correspond with the shape of the inner air deflecting surface 70 of the vane 60 described in connection with the preceding Figs. It will be appreciated that the air deflecting vane 86 of FIG. 5 will operate in similar fashion to the vane 60 of the previous FIGS., except that the position of the vane is fixed. The optimum position will be determined by the manufacturer of the vehicle and will not require adjustment after initial installation.

It will of course be appreciated that the preceding description relates to specific embodiments of the invention and that many modifications are possible within the broad scope of the invention. For example, while the vane of the defogging device has been described as defining an air deflecting face of flattened S-shape in cross-section, this shape is not essential. A flat air deflecting surface may be adequate in some circumstances. Further, it is to be understood that the protuberant ribs or fins 71 on the air deflecting surface of the vane may be shaped and/or arranged differently from the example described and illustrated in this application, or may be omitted entirely.

Any appropriate form of vane mounting means may be employed in the defogging device. The ball and socket arrangement described is not essential and could, in suitable cases, be replaced by a fixed mounting arrangement. The device may be attached to the body structure of the vehicle by screws, rivets or other fastening means.

It should also be noted that the position of the defogging device may be varied from that shown in the drawings. The optimum position may vary from vehicle to vehicle and may be influenced by other considerations such as ease of access to the interior of the vehicle. For example, in suitable cases, the defogging devices could be mounted above the upper edge of the vehicle windshield. In that event, it would probably be necessary to provide specially shaped vanes to deflect the air both downwardly and laterally. Also, the device could be mounted directly on the windshield.

As indicated above, the mounting member and vane member of the device may be moulded in a plastic material (e.g. by an injection moulding technique). Any suitable material may be used, e.g. a PVC or ABS plastic. The members may be transparent or may be suitably coloured. In the case of a built-in defogging device the vane member may be made of the same material as the door pillar or other part of the body structure in which it is incorporated. The vane member may in fact be formed integrally with the relevant part of the body structure.

In the preceding description, the invention has been described in use in the environment of a passenger car. It is, however, to be understood that there is no limitation in this and that the device may find application in any motor vehicle having a windshield, at least one side window disposed rearwardly of the windshield, and a heater system for directing heated air over the inner surface of the windshield. Thus, the invention may even be used in motor vehicles such as boats and aircraft. Also, it should be noted that the term "defogging" as used in this application is intended to include prevention of fog and frost buildup, defrosting and moisture removal generally.

What I claim is:

1. In a motor vehicle having: a body structure which includes a windshield, two generally upright pillars at opposite sides of said windshield, and at least one side window disposed rearwardly of the windshield; and a heater system having heated air outlet means adjacent a lower edge of said windshield arranged to direct heated air upwardly and laterally outwardly over the inner surface of the windshield;

the improvement comprising a side window defogging device associated with at least one of said pillars and disposed in the path of heated air directed over the inner surface of the windshield towards said pillar from said heated air outlet means, the device being manufactured as an initially separate unit and including a vane member, and means mounting the member on the body structure of the vehicle, said vane member defining an air deflecting surface which is spaced from said vehicle body structure and which is arranged to deflect approaching heated air towards the inner surface of said side window, and said mounting means including a member attached to the body structure of the vehicle, and means coupling said mounting member with said vane member, said mounting member being flexible to conform with the contour of the part of the body structure to which it is attached, and defining an attachment face having thereon a pressure sensitive adhesive coupling said member with said vehicle body structure.

2. The invention claimed in claim 1, wherein said air deflecting surface of the vane member is generally of flattened S-shape in transverse cross-section and is of uniform cross-section throughout its length.

3. In a motor vehicle having: a body structure which includes a windshield, two generally upright pillars at opposite sides of said windshield, and at least one side window disposed rearwardly of the windshield; and a heater system having heated air outlet means adjacent a lower edge of said windshield arranged to direct heated air upwardly and laterally outwardly over the inner surface of the windshield;

the improvement comprising a side window defogging device associated with at least one of said pillars and disposed in the path of heated air directed over the inner surface of the windshield towards said pillar from said heated air outlet means, the device including a vane member and means mounting the member on the body structure of the vehicle, said vane member defining an air deflecting surface spaced from said vehicle body structure, said surface having a transverse cross-section which is generally of flattened S-shape and which is uniform throughout the length of the surface, and said surface being arranged to deflect approaching heated air towards the inner surface of said side window.

4. The invention claimed in claim 3, wherein the defogging device is manufactured as an initially separate unit, and wherein said mounting means includes a member attached to said pillar of the vehicle, and means coupling said mounting member with said vane member.

5. The invention claimed in claim 4, wherein said coupling means is adjustable to vary the position of said air deflecting surface, the coupling means comprising an elongate element extending between said mounting member and said vane member and having opposite ends, and ball and socket means between each of said opposite ends of the element and each of said members.

6. The invention claimed in claim 4, wherein said mounting member is flexible to conform with the contour of the part of the body structure to which it is attached, and wherein the said mounting member defines an attachment face having thereon a pressure sensitive adhesive coupling said member and said vehicle body structure.

7. The invention claimed in claim 3, wherein said defogging device is built into the vehicle as manufactured, said mounting means serving to integrally couple the vane member with the body structure of the vehicle.

* * * * *